United States Patent
Moteki

(10) Patent No.: US 12,307,780 B2
(45) Date of Patent: May 20, 2025

(54) IMAGE PROCESSING APPARATUS, IMAGING APPARATUS, MOVABLE OBJECT, AND METHOD FOR IMAGE PROCESSING

(71) Applicant: KYOCERA Corporation, Kyoto (JP)

(72) Inventor: Ryosuke Moteki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 426 days.

(21) Appl. No.: 17/597,082

(22) PCT Filed: Jun. 2, 2020

(86) PCT No.: PCT/JP2020/021797
§ 371 (c)(1),
(2) Date: Dec. 23, 2021

(87) PCT Pub. No.: WO2020/261898
PCT Pub. Date: Dec. 30, 2020

(65) Prior Publication Data
US 2022/0319187 A1    Oct. 6, 2022

(30) Foreign Application Priority Data
Jun. 25, 2019   (JP) ................................ 2019-117763

(51) Int. Cl.
*G06V 20/58*   (2022.01)
*B60W 40/04*   (2006.01)
(Continued)

(52) U.S. Cl.
CPC ............. *G06V 20/58* (2022.01); *B60W 40/04* (2013.01); *G06V 40/103* (2022.01); *G06V 40/20* (2022.01);
(Continued)

(58) Field of Classification Search
None
See application file for complete search history.

(56) References Cited

U.S. PATENT DOCUMENTS

| 8,447,761 B2 | 5/2013 | Sakata et al. |
| 8,457,827 B1 | 6/2013 | Ferguson et al. |

(Continued)

FOREIGN PATENT DOCUMENTS

| DE | 102014111023 A1 | 2/2016 |
| JP | 2003-343305 A | 12/2003 |

(Continued)

OTHER PUBLICATIONS

Wang, P., Motamedi, S., Qi, S., Zhou, X., Zhang, T., & Chan, C. Y. (2021). Pedestrian interaction with automated vehicles at uncontrolled intersections. Transportation research part F: traffic psychology and behaviour, 77, 10-25. (Year: 2021).*

(Continued)

*Primary Examiner* — Michelle M Entezari Hausmann
(74) *Attorney, Agent, or Firm* — Studebaker & Brackett PC

(57) ABSTRACT

An image processing apparatus 10 includes an output unit 14 and a processor 16. The output unit 14 outputs to a movable object 12 information indicating an action to be performed by the movable object 12. The processor 16 determines a first action of the movable object 12 based on a state of a target, the state being sensed in imagery of a region around the movable object 12. The processor 16 causes the output unit 14 to output information indicating the first action. The processor 16 determines a second action of the movable object 12 based on a state of the target, the state being sensed in imagery of the region around the movable object 12, the imagery being captured after the first action of the movable object 12. The processor 16 causes the output unit 14 to output information indicating the second action at a time depending on a speed of a predetermined motion of the target. The predetermined motion of the target is a motion (Continued)

that the target makes before the first action is determined or after the first action of the movable object 12.

12 Claims, 4 Drawing Sheets

(51) Int. Cl.
   *G06V 40/10* (2022.01)
   *G06V 40/16* (2022.01)
   *G06V 40/20* (2022.01)
(52) U.S. Cl.
   CPC ..... *B60R 2300/105* (2013.01); *B60R 2300/20* (2013.01); *B60R 2300/30* (2013.01); *G06V 40/174* (2022.01); *G06V 2201/07* (2022.01)

(56) References Cited

U.S. PATENT DOCUMENTS

| | | | |
|---|---|---|---|
| 10,741,082 | B2 | 8/2020 | Kurata |
| 2008/0065328 | A1* | 3/2008 | Eidehall ............... G01S 7/295 701/301 |
| 2009/0143987 | A1* | 6/2009 | Bect .................... B60R 21/0134 701/300 |
| 2011/0208790 | A1 | 8/2011 | Sakata et al. |
| 2013/0191003 | A1* | 7/2013 | Hahne .................... B60W 50/14 701/99 |
| 2014/0236414 | A1* | 8/2014 | Droz ...................... G08G 1/015 701/1 |
| 2015/0307025 | A1 | 10/2015 | Hedley |
| 2015/0344030 | A1* | 12/2015 | Damerow ............. G06V 20/588 701/1 |
| 2017/0113689 | A1 | 4/2017 | Gordon et al. |
| 2017/0315556 | A1* | 11/2017 | Mimura ............... G05D 1/0061 |
| 2018/0129981 | A1* | 5/2018 | Fujimoto ............. G06V 20/593 |
| 2018/0197415 | A1 | 7/2018 | Kurata |
| 2019/0235515 | A1* | 8/2019 | Shirvani ............. G05D 1/0221 |
| 2019/0279026 | A1* | 9/2019 | Sato ........................ G06V 10/96 |
| 2019/0308617 | A1 | 10/2019 | Groult et al. |
| 2020/0058218 | A1 | 2/2020 | Julian et al. |
| 2020/0272143 | A1* | 8/2020 | Scott ...................... G05D 1/223 |
| 2020/0342757 | A1 | 10/2020 | Moteki et al. |
| 2021/0163013 | A1 | 6/2021 | Ueno et al. |

FOREIGN PATENT DOCUMENTS

| | | |
|---|---|---|
| JP | 2005-182198 A | 7/2005 |
| JP | 2005-255091 A | 9/2005 |
| JP | 2008-243065 A | 10/2008 |
| JP | 2010-066810 A | 3/2010 |
| JP | 2010-271906 A | 12/2010 |
| JP | 2011-138492 A | 7/2011 |
| JP | 2018-112892 A | 7/2018 |
| WO | 2018-078713 A1 | 5/2018 |
| WO | 2019146385 A1 | 8/2019 |

OTHER PUBLICATIONS

Domeyer, Joshua, et al. "Proxemics and kinesics in automated vehicle-pedestrian communication: Representing ethnographic observations." Transportation research record 2673.10 (2019): 70-81. (Year: 2019).*

Fang, Zhijie, and Antonio M. Lopez. "Intention recognition of pedestrians and cyclists by 2d pose estimation." IEEE Transactions on Intelligent Transportation Systems 21.11 (2019): 4773-4783. (Year: 2019).*

Zhang, S., Abdel-Aty, M., Wu, Y., & Zheng, O. (2021). Pedestrian crossing intention prediction at red-light using pose estimation. IEEE transactions on intelligent transportation systems, 23(3), 2331-2339. (Year: 2021).*

Habibovic, Azra, Victor Malmsten Lundgren, Jonas Andersson, Maria Klingegård, Tobias Lagström, Anna Sirkka, Johan Fagerlönn et al. "Communicating intent of automated vehicles to pedestrians." Frontiers in psychology 9 (2018): 1336. (Year: 2018).*

Camara, Fanta, et al. "Pedestrian models for autonomous driving part ii: high-level models of human behavior." IEEE Transactions on Intelligent Transportation Systems 22.9 (2020): 5453-5472. (Year: 2020).*

Bindschadel, Janina, Ingo Krems, and Andrea Kiesel. "Two-step communication for the interaction between automated vehicles and pedestrians." Transportation research part F: traffic psychology and behaviour 90 (2022): 136-150. (Year: 2022).*

Li, Yeti, et al. "To cross or not to cross: Urgency-based external warning displays on autonomous vehicles to improve pedestrian crossing safety." Proceedings of the 10th International Conference on Automotive User Interfaces and Interactive Vehicular Applications. 2018. (Year: 2018).*

Yoshitake Ohwada et al., U.S. Appl. No. 17/597,082, filed May 26, 2021, which corresponds to U.S. Appl. No. 17/597,082.

Round Lake Park Police Department; "Road Rage Prevention and Awareness"; 2001; total 7 pages; Round Lake Park, Illinois, USA; URL: https://rlppd.us/road-rage-prevention-and-awareness/.

Google Search; "Being tailgated pulling over into 'gas station'"; 2001; total 1 page.

Cubbard Express; "Three Benefits of Shopping at Your Local Gas Station"; Cubbard Express Blog; Aug. 19, 2016; total 5 pages; North Carolina, USA; URL: https://cubbardexpress.com/cubbard-express-blog/three-benefits-of-shopping-at-your-local-gas-station/.

Kentucky Office of Highway Safety; "Aggresive Driving"; 2018; total 1 page; Kentucky Transportation Cabinet; KY, USA; https://transportation.ky.gov/HighwaySafety/Documents/AggressiveDriving%20UPDATE.pdf.

* cited by examiner

IMAGE PROCESSING APPARATUS, IMAGING APPARATUS, MOVABLE OBJECT, AND METHOD FOR IMAGE PROCESSING

CROSS-REFERENCE TO RELATED APPLICATIONS

This application claims priority from Japanese Patent Application No. 2019-117763 filed Jun. 25, 2019, the content of which is all incorporated herein by reference.

TECHNICAL FIELD

The present invention relates to an image processing apparatus, an imaging apparatus, a movable object, and a method for image processing.

BACKGROUND ART

Technologies for sensing a target in imagery captured by using a camera have been known in the art.

For example, a description has been provided with regard to determination of moving speeds of a knee position and an upper-body position of a pedestrian by using imagery captured by a vehicle-mounted camera, which captures imagery of a region around a vehicle (refer to PTL 1).

CITATION LIST

Patent Literature

PTL 1: Japanese Unexamined Patent Application Publication No. 2010-066810

SUMMARY OF INVENTION

An image processing apparatus according to a first aspect of the present disclosure includes an output unit that outputs to a movable object information indicating an action to be performed by the movable object, and a processor that determines a first action of the movable object based on a state of a target, the state being sensed in captured imagery of a region around the movable object, that causes the output unit to output information indicating the first action, that determines a second action of the movable object based on a state of the target, the state being sensed in imagery of the region around the movable object, the imagery being captured after the first action of the movable object, and that causes the output unit to output information indicating the second action at a time depending on a speed of a predetermined motion that the target makes before the first action is determined or after the first action of the movable object.

An imaging apparatus according to a second aspect of the present disclosure includes an image processing apparatus including an output unit that outputs to a movable object information indicating an action to be performed by the movable object, and a processor that determines a first action of the movable object based on a state of a target, the state being sensed in captured imagery of a region around the movable object, that causes the output unit to output information indicating the first action, that determines a second action of the movable object based on a state of the target, the state being sensed in imagery of the region around the movable object, the imagery being captured after the first action of the movable object, and that causes the output unit to output information indicating the second action at a time depending on a speed of a predetermined motion that the target makes before the first action is determined or after the first action of the movable object, and an imaging unit that generates the imagery of the region around the movable object.

A movable object according to a third aspect of the present disclosure includes an imaging apparatus including an image processing apparatus including an output unit that outputs to the movable object information indicating an action to be performed by the movable object and a processor that determines a first action of the movable object based on a state of a target, the state being sensed in captured imagery of a region around the movable object, that causes the output unit to output information indicating the first action, that determines a second action of the movable object based on a state of the target, the state being sensed in imagery of the region around the movable object, the imagery being captured after the first action of the movable object, and that causes the output unit to output information indicating the second action at a time depending on a speed of a predetermined motion that the target makes before the first action is determined or after the first action of the movable object, and an imaging unit that generates the imagery of the region around the movable object.

A method for image processing according to a fourth aspect of the present disclosure includes sensing a state of a target in captured imagery of a region around a movable object, determining a first action of the movable object based on the state of the target, outputting information indicating the first action to the movable object, sensing a state of the target in imagery of the region around the movable object, the imagery being captured after the first action of the movable object, determining a second action of the movable object based on the state of the target, and outputting information indicating the second action to the movable object at a time depending on a speed of a predetermined motion that the target makes before the first action is determined or after the first action of the movable object.

DESCRIPTION OF EMBODIMENTS

Hereinafter, a description will be provided with regard to an image processing apparatus according to an embodiment of the present invention with reference to the drawings.

Figure 1:
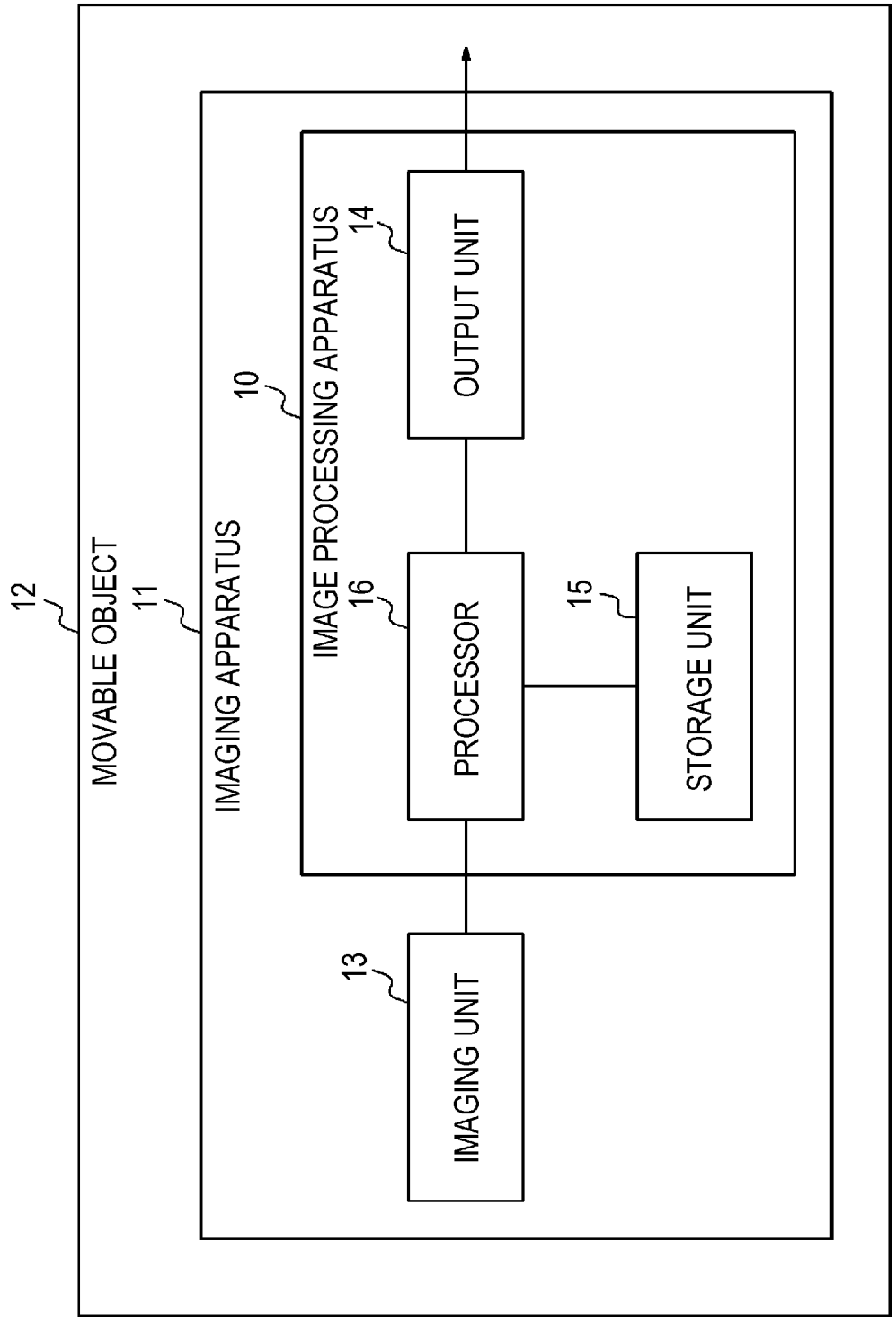
FIG. 1 is a block diagram depicting an example of a configuration of an image processing apparatus according to an embodiment of the present disclosure.

An imaging apparatus 11 including an image processing apparatus 10 according to an embodiment of the present disclosure is mounted, for example, in or on a movable object 12 as depicted in FIG. 1.

Examples of the movable object 12 may include a vehicle. Examples of a vehicle may include an automobile, an industrial vehicle, a rail car, a resident car, and a fixed-wing aircraft that taxies along a runway. Examples of an automobile may include a passenger car, a truck, a bus, a motorcycle, and a trolleybus. Examples of an industrial vehicle may include vehicles used for agriculture and vehicles used for construction. Examples of an industrial vehicle may include a forklift truck and a golf cart. Examples of an industrial vehicle used for agriculture may include a tractor, a cultivator, a transplanting machine, a binder, a combine, and a lawnmower. Examples of an industrial vehicle used for construction may include a bulldozer, a scraper, an excavator, a crane truck, a dump truck, and a road roller. Examples of a vehicle may include a human-powered vehicle. Categories of vehicles are not limited to the examples described above. For example, examples of an automobile may include an industrial vehicle that can run on a road. One vehicle may be included in multiple categories.

The imaging apparatus 11 includes an imaging unit 13 and the image processing apparatus 10.

Examples of the imaging unit 13 include a vehicle-mounted camera mounted in or on the movable object 12. The imaging unit 13 generates imagery that captures a region around the movable object 12 and outputs the imagery to the image processing apparatus 10. Multiple imaging units 13 may be mounted in or on the movable object 12. For example, if four vehicle-mounted cameras are mounted in or on the movable object 12, the multiple imaging units 13 are disposed separately at a position from which imagery of a neighboring region in front of the movable object 12 can be captured, a position from which imagery of a neighboring region behind the movable object 1 can be captured, a position from which imagery of a neighboring region on the left side of the movable object 1 can be captured, and a position from which imagery of a neighboring region on the right side of the movable object 12 can be captured. Imagery of the neighboring regions of the movable object 12 in all directions can be captured with such an arrangement.

The imaging unit 13 at least includes imaging optics and an imaging element. The imaging optics include optical components such as one or more lenses and apertures. A lens included in the imaging optics has a wide angle of view, and a fisheye lens or the like is an example. The imaging optics form a subject image on a photosensitive surface of the imaging element. Examples of the imaging element include a charge coupled device (CCD) image sensor and a complementary metal-oxide semiconductor (CMOS) image sensor. The imaging element captures the subject image formed on the photosensitive surface and generates imagery of a surrounding region.

The imaging unit 13 outputs the imagery of a surrounding region generated by the imaging element to the image processing apparatus 10 via wireline or wireless communication. The imaging unit 13 may output the imagery of the surrounding region to external devices such as an electronic control unit (ECU), a display, and a navigation device, which are mounted in or on the movable object 12.

The image processing apparatus 10 senses a state of a target by using imagery of a region around the movable object 12 and determines in accordance with the sensed state of the target an action to be performed by the movable object 12. Examples of a target include a person, another movable object, and an animal. Examples of a person as a target include a pedestrian and a person riding a bicycle. Examples of the movable object 12 include a vehicle having an autonomous driving capability. The term "autonomous driving" used in the present embodiment indicates automation of all or part of operation to be performed by a user who drives a vehicle. For example, autonomous driving may involve one of Level 1 to Level 5 defined by the Society of Automotive Engineers (SAE). In the following description, it is assumed that the movable object 12 has a full autonomous driving capability in a level equal to or higher than Level 4 defined by SAE. In the following description, a vehicle having a full autonomous driving capability is sometimes referred to as a full autonomous driving vehicle.

The image processing apparatus 10 includes an output unit 14, a storage unit 15, and a processor 16.

The output unit 14 is, for example, a communication interface and communicates with various ECUs of the movable object 12 via wireline or wireless communication. The output unit 14 outputs to the movable object 12 information indicating an action to be performed by the movable object 12. The output unit 14 outputs the information indicating the action to be performed by the movable object 12, for example, by communicating with an ECU that controls driving of the movable object 12 and an ECU that controls operations of the movable object 12, such as causing a light and a turn signal to blink and sounding a horn.

The output unit 14, which is the communication interface, communicates with various ECUs of the movable object 12 and may acquire information from the various ECUs, the information including actions that have been performed by the movable object 12, a path ahead of the movable object 12, and traffic in the surrounding region. The actions that have been performed by the movable object 12 include moving forward, moving backward, stopping, slowing down, changing direction, switching on a light, flashing, causing a turn signal to blink, sounding a horn, presenting a display viewable from outside, maintaining the current state, outputting a voice message, and projecting a predetermined image.

The storage unit 15 includes one or more memories. The term "memory" used in the present embodiment indicates a semiconductor memory, a magnetic memory, or an optical memory as non-limiting examples. Each memory included in the storage unit 15 may function, for example, as a main storage device, an auxiliary storage device, or a cache memory. The storage unit 15 may store any information to be used for operations of the image processing apparatus 10. The storage unit 38 may store, for example, a system program, an application program, and other programs.

The processor 16 includes at least one of a general-purpose processor and a dedicated processor. The general-purpose processor loads a specific program and executes a specific function, and the dedicated processor is designed exclusively for a specific process. The dedicated processor may include an application specific integrated circuit (ASIC). The processor 16 may include a programmable logic device (PLD). The PLD may include a field-programmable gate array (FPGA). The processor 16 controls operation of each building component of the image processing apparatus 10.

Figure 2:
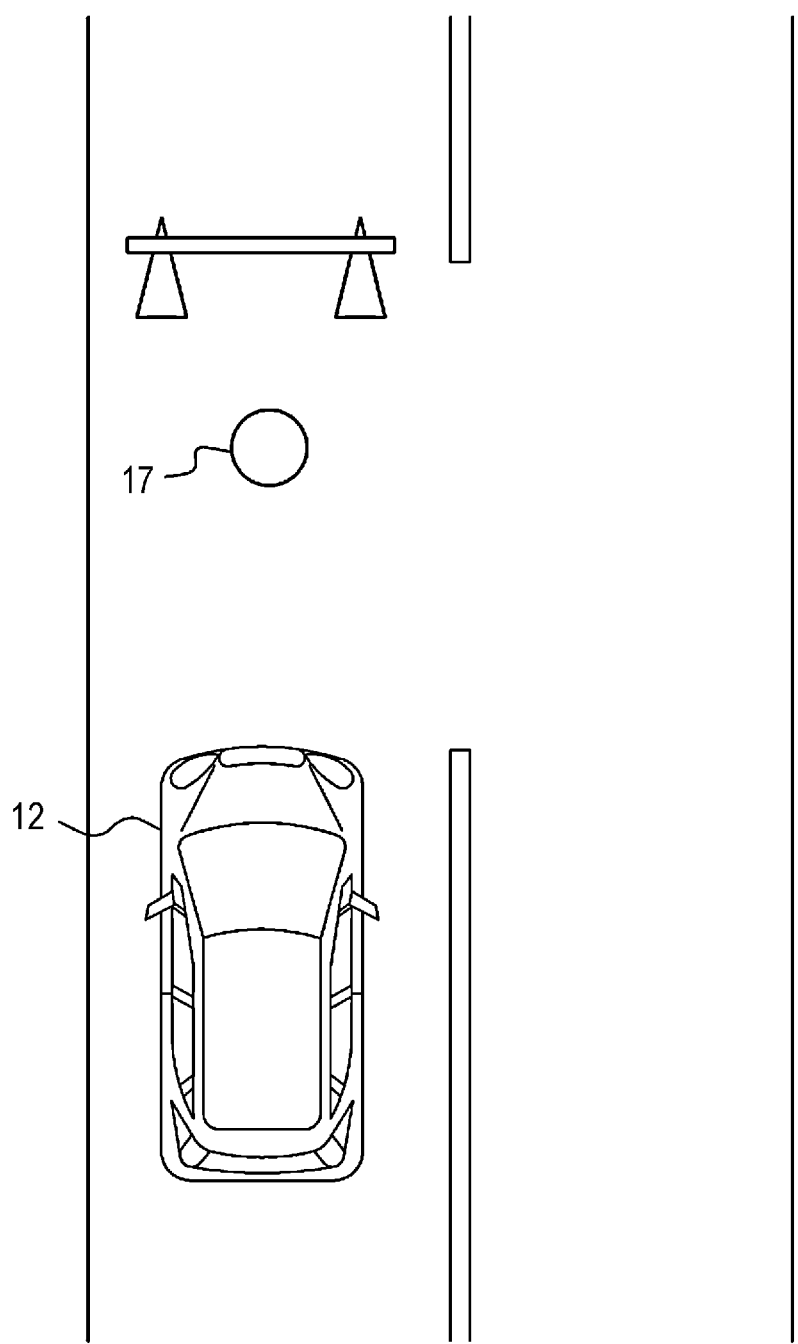
FIG. 2 is an illustration depicting a first example in which a stalemate between a movable object and a target occurs.
Figure 3:
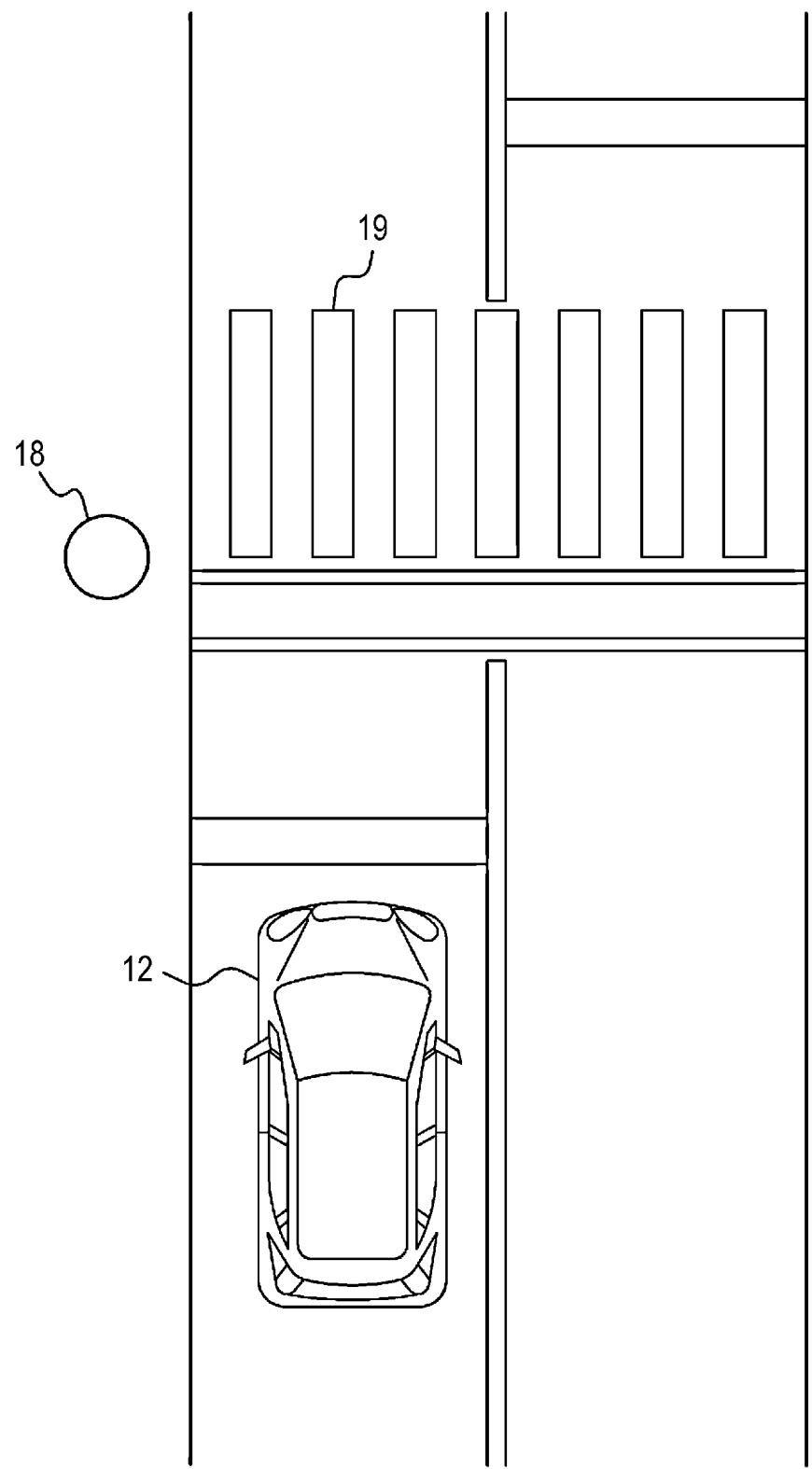
FIG. 3 is an illustration depicting a second example in which a stalemate between a movable object and a target occurs.

The processor 16 determines whether a target is present, for example, in imagery of the surrounding region acquired from the imaging unit 13. Examples of a target include a flagman in a specific situation, a pedestrian in a specific situation, and other movable objects. Examples of a flagman 17 in a specific situation include a person who regulates traffic when a path ahead of the movable object 12 is under construction and one of two lanes is blocked as depicted in FIG. 2. Examples of a pedestrian 18 in a specific situation include a person near an end of a crosswalk 19 across a path ahead of the movable object 12 as depicted in FIG. 3.

Once the processor 16 senses the presence of a target in imagery of the surrounding region, the processor 16 senses a state of the target. For example, if the target is the flagman 17 or the pedestrian 18 in a specific situation, the processor 16 senses a state in accordance with at least one piece of information regarding the flagman 17 or the pedestrian 18. Examples of one piece of information regarding the flagman 17 or the pedestrian 18 include the direction of movement, the facing direction of the head or the direction of the line of sight, the facial expression, and the limbs.

For example, if the target is the flagman 17 in the specific situation, which is depicted in FIG. 2, the state that is sensed is a state in which the flagman 17 is making either a gesture to allow passage, a gesture to forbid passage, a gesture to give a direction to follow, or an unclear gesture. For example, if the target is the pedestrian 18 in the specific situation, which is depicted in FIG. 3, examples of the state that is sensed include a state in which the pedestrian 18 is standing still in front of the crosswalk 19, a state in which the pedestrian 18 starts crossing, and a state in which the pedestrian 18 is making either a gesture indicating no intention of walking on the crosswalk 19 or a gesture to encourage forward movement of the movable object 12.

If the target is a person, such as the flagman 17 or the pedestrian 18, the processor 16 may sense a change in a facial expression by using multiple pieces of imagery of the surrounding region that form consecutive frames. For example, an intensity of a specific feeling such as anger may be scored with respect to a normal facial expression, and a change in a facial expression may be sensed as a change in the score.

Upon sensing the state of the target, the processor 16 determines based on the state of the target a first action to be performed by the movable object 12, the first action being selected from various actions that the movable object 12 can perform. Examples of the various actions that the movable object 12 can perform include moving forward, moving backward, stopping, slowing down, changing direction, switching on a light, flashing, causing a turn signal to blink, sounding a horn, presenting a display viewable from outside, maintaining the current state, outputting a voice message, and projecting a predetermined image.

The processor 16 determines stopping as the first action if the target is in one of the specific states that are defined for the target. Examples of the specific states include a state in which the flagman 17 is making an unclear gesture in the specific situation and a state in which the pedestrian 18 is standing still in the specific situation. Once the first action is determined, the processor 16 causes the output unit 14 to output information indicating the first action to various ECUs.

After outputting the first action or recognizing the notification sent from an ECU that has detected the execution of the first action, the processor 16 senses in the imagery of the surrounding region, which is acquired from the imaging unit 13, the state of the target for which the first action has been determined.

The processor 16 calculates the speed of a predetermined motion determined for the state of the target for which the first action has been determined. The speed of a predetermined motion that is made either before the first action is determined or after the first action of the movable object 12 is calculated. If the target is the flagman 17 in the specific situation, examples of the predetermined motion include the unclear gesture described above. If the target is the pedestrian 18 in the specific situation, examples of the predetermined motion include the pedestrian 18 running and walking. The processor 16 calculates the speed of the predetermined motion by using multiple pieces of imagery of the surrounding region that form consecutive frames.

The processor 16 determines based on the sensed state of the target a second action to be performed by the movable object 12, the second action being selected from various actions that the movable object 12 can perform. If it is determined based on the sensed state of the target that no meaningful response to the first action is obtained, the processor 16 may determine an action to attract attention of the target as the second action.

A meaningful response indicates a response by which the intention of the target is recognizable. If the target is the flagman 17 in the specific situation, examples of a meaningful response include a gesture to allow passage, a gesture to forbid passage, and a gesture to provide a direction to follow. If the target is the pedestrian 18 in the specific situation, examples of a meaningful response include a state in which the pedestrian 18 starts crossing and a state in which the pedestrian 18 makes either a gesture indicating no intention of walking on the crosswalk 19 or a gesture to encourage forward movement of the movable object 12.

Examples of the action to attract attention of the target include flashing, moving forward by a small amount, sounding a horn, outputting a voice message, and projecting a predetermined image. Flashing indicates switching on a headlight of the movable object 12 in an upward direction (high beam) for an instant, and moving forward by a small amount indicates moving the movable object 12 forward by several tens of centimeters. The second action may be formed by one of these actions to attract attention of the target or by an appropriate combination of these actions.

To determine the second action, the processor 16 may use imagery of the surrounding region captured during a time period that elapses after the first action is performed, the time period depending on the calculated speed of the predetermined motion. The time period may be determined, for example, so as to decrease as the speed of the predetermined motion increases.

The processor 16 causes the output unit 14 to output information indicating the second action, which has been determined, to the various ECUs at a time depending on the calculated speed of the predetermined motion. The time may be determined with respect to the time point at which the information indicating the first action is output. The time may be advanced as the speed of the predetermined motion increases.

The processor 16 may change the time in accordance with not only the predetermined motion but also the traffic around the movable object 12. The time may be advanced as the traffic around the movable object 12 becomes busier. If the target is a person, the processor 16 may change the time in accordance with not only the predetermined motion and further the traffic in the surrounding region but also a change in the facial expression of the target, which has been sensed. The time may be advanced as the change in the facial expression of the target increases.

After outputting the second action or recognizing the notification sent from an ECU that has detected the execution of the second action, the processor 16 senses in the imagery of the surrounding region, which is acquired from the imaging unit 13, the state of the target for which the second action has been determined.

Thereafter, the processor 16 repeats an operation of sensing the state of the target in the imagery of the surrounding region, determining an action to be performed by the movable object 12, and outputting the action that has been determined. The operation is repeated until the target reaches a specific stage, or the operation is repeated a predetermined number of times. The operation is similar to the operation being conducted after the first action is performed and until the information indicating the second action is output. The specific stage is, for example, a state in which the target is making a meaningful response. The predetermined number of times is, for example, three times.

When causing the movable object 12 to perform multiple actions after the first action, the processor 16 may determine a different action each time. When determining a different action for each of the multiple actions performed after the first action, the processor 16 may determine an action in accordance with priorities predetermined for each state of the target.

The processor 16 may change the predetermined priorities in accordance with the environment around the movable object 12. For example, for an operation at night, the processor 16 may assign a low priority to an action that may cause loud noise, such as sounding a horn, and assign a high priority to an action that does not cause loud noise, such as switching on a light, flashing, or causing a turn signal to blink.

The processor 16 may terminate full autonomous driving of the movable object 12 if the movable object 12 has been caused to perform a predetermined number of actions before the target reaches the specific stage.

Figure 4:
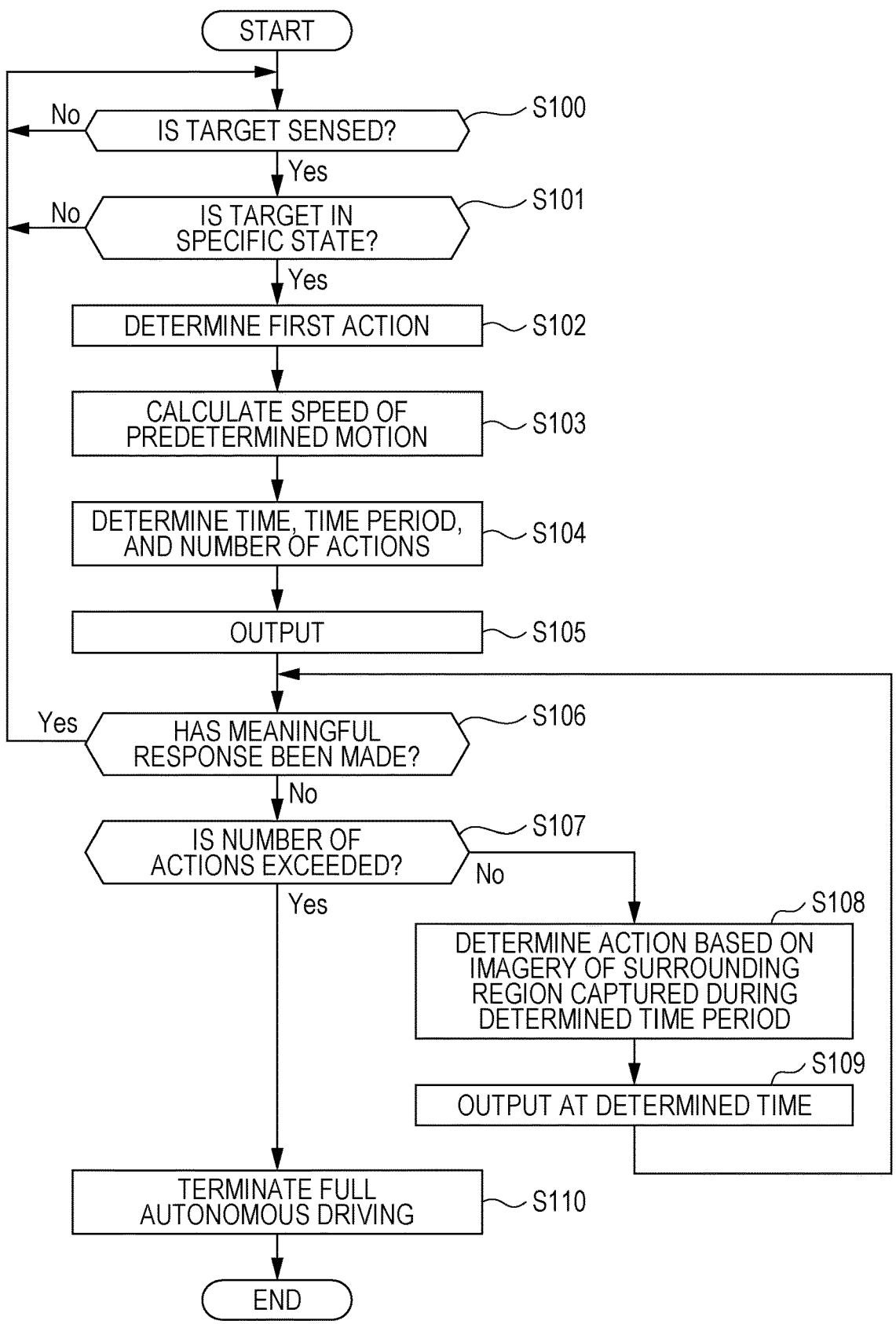
FIG. 4 is a flowchart for describing a reaction process performed by a controller depicted in FIG. 1.

Next, a reaction process performed by the processor 16 in the present embodiment will be described with reference to a flowchart in FIG. 4. The reaction process starts when full autonomous driving of the movable object 12 starts.

In step S100, the processor 16 determines whether a target is sensed in imagery of the surrounding region that is acquired from the imaging unit 13. If it is determined that a target is not sensed, the process returns to step S100. If it is determined that a target is sensed, the process proceeds to step S101.

In step S101, the processor 16 determines whether the state of the target that is sensed in step S100 is a specific state. If it is determined that the state of the target is not a specific state, the process returns to step S100. If it is determined that the state of the target is a specific state, the process proceeds to step S102.

In step S102, the processor 16 determines a first action to be performed by the movable object 12. After the determination, the process proceeds to step S103.

In step S103, the processor 16 calculates the speed of a predetermined motion that is determined for the state of the target for which the first action has been determined in step S102. After the calculation of the speed, the process proceeds to step S104.

In step S104, the processor 16 determines based on the speed calculated in step S103 both a time to output information indicating a second action and a time period during which imagery of the surrounding region is captured to determine the second action. The processor 16 also determines in accordance with the state of the target for which the first action has been determined in step S102 the number of actions to be performed on the target. After the determination, the process proceeds to step S105.

In step S105, the processor 16 causes the output unit 14 to output information indicating the first action, which has been determined, to the various ECUs. After the output, the process proceeds to step S106.

In step S106, based on a state of the target that is sensed in imagery of the surrounding region captured after the first action has been performed by the movable object 12, the processor 16 determines whether the target has made a meaningful response. If it is determined that a meaningful response has been made, full autonomous driving is performed in accordance with the meaningful response, and the process returns to step S100. If it is determined that a meaningful response has not been made, the process proceeds to step S107.

In step S107, the processor 16 determines whether the number of actions that have been determined after the first action is performed exceeds the number determined in step S104. If the determination is negative, the process proceeds to step S108. If the determination is affirmative, the process proceeds to step S110.

In step S108, the processor 16 senses a state of the target by using imagery of the surrounding region captured during the time period, which elapses after the first action is performed, the time period being determined in step S104. The processor 16 determines based on the sensed state of the target an action that the movable object 12 is to perform. After the action is determined, the process proceeds to step S109.

In step S109, at the time determined in step S104, the processor 16 causes the output unit 14 to output information indicating the action, which has been determined in step S108, to the various ECUs. After the output, the process returns to step S106.

In step S110, the processor 16 causes the output unit 14 to output information indicating the termination of the full autonomous driving to the various ECUs. After the output, the reaction process ends.

The image processing apparatus 10 according to the present embodiment, which is configured as described above, determines the first action of the movable object 12 based on the state of the target sensed in the imagery of the surrounding region and determines the second action of the movable object 12 based on the state of the target sensed in the imagery of the surrounding region captured after the first action of the movable object 12. Advantageous effects provided by the image processing apparatus 10, which is configured in this way, will be described below.

A full autonomous driving vehicle that has been conceived in the art sometimes causes a stalemate with a target.

A stalemate can occur, for example, in a situation in which the flagman 17 is standing in a path ahead of a movable object, which is a full autonomous driving vehicle that has been conceived in the art, as depicted in FIG. 2. The flagman 17 generally makes either a gesture to allow the movable object to pass or a gesture to forbid the movable object from passing. However, the movable object can fail to recognize a gesture, for example, because the gesture by the flagman 17 is different from a gesture that is usually made. The movable object is generally expected to prioritize safety and stop under such circumstances. If the gesture by the flagman 17 keeps unrecognizable after the stop, the movable object remains stopped. In this way, it is possible that a stalemate between the movable object and the flagman 17 occurs and smooth traffic is obstructed.

Further, a stalemate can occur, for example, in a situation in which the pedestrian 18 is standing near an end of the crosswalk 19 across a path ahead of a movable object, which is a full autonomous driving vehicle that has been conceived in the art, as depicted in FIG. 3. Under such circumstances, the movable object stops in front of the crosswalk 19 to allow the pedestrian 18 to walk on the crosswalk 19.

However, the pedestrian 18 does not necessarily walk on the crosswalk 19 and can be standing still near the crosswalk 19. Under such circumstances, the movable object remains stopped in front of the crosswalk 19 because the pedestrian 18 is standing still near the end of the crosswalk 19 despite having no intention to walk on the crosswalk 19. In this way, it is possible that a stalemate between the movable object and the pedestrian 18 occurs and smooth traffic is obstructed.

In contrast, if a meaningful response cannot be obtained from the target in a situation in which a stalemate such as described above can occur, the image processing apparatus 10, which is configured as describe above, performs a further action on the target and can thereby sense the intention of the target by encouraging a new response from the target. Thus, the image processing apparatus 10 can achieve smooth traffic by decreasing the probability of causing a stalemate and can consequently improve the convenience of using the movable object 12 for transportation.

Further, the image processing apparatus 10 according to the present embodiment outputs information indicating the second action at a time depending on the speed of the predetermined motion of the target. Generally, it is possible that each target expects that the second action is performed at a different time in response to the motion made as a response to the first action. For example, if the target is a person, such a person as is either impatient or in a hurry is likely to expect a quick action as a response from the movable object 12 to the motion or the state of the target. Further, in general, an impatient person and a person being in a hurry quickly perform motions such as a gesture, walking, and running. In such circumstances, since the image processing apparatus 10, which is configured as described above, reacts to a response from the target and outputs the second action to the movable object 12 at a time that the target strongly wants, a response from the target can more smoothly be encouraged. Accordingly, the image processing apparatus 10 can further improve the convenience of using the movable object 12 for transportation.

Further, to determine the second action, the image processing apparatus 10 according to the present embodiment uses the imagery of the surrounding region captured during a time period that elapses after the first action of the movable object 12, the time period depending on the speed of the predetermined motion. Generally, it is also possible that each target responds to the first action of the movable object 12 with a different response time, which is the time period that elapses before the target responds. For example, if the target is a person, such a person as is either impatient or in a hurry is likely to respond to the first action instantly, and such a person as is either placid or not in a hurry is likely to respond to the first action slowly. In such circumstances, the image processing apparatus 10, which is configured as described above, can determine the second action after waiting for the target to respond to the first action of the movable object 12. Accordingly, since the image processing apparatus 10 can comprehend the intention of the target accurately and improve the accuracy of the comprehension, the image processing apparatus 10 can further improve the convenience of using the movable object 12 for transportation.

Further, the image processing apparatus 10 according to the present embodiment also changes the time to output information indicating the second action in accordance with the traffic around the movable object 12. Generally, a requirement for the promptness of an action of the movable object 12 changes in accordance with the traffic. In such circumstances, since not only the speed of a motion of the target but also the traffic is reflected, the image processing apparatus 10, which is configured as described above, can further improve the convenience of using the movable object 12 for transportation.

Further, the image processing apparatus 10 according to the present embodiment determines in accordance with predetermined priorities multiple actions to be performed after the first action. Various actions that can be performed by the movable object 12 have different capabilities of alerting the target and different degrees of inconvenience caused to the neighbors. In such circumstances, the image processing apparatus 10, which is configured as described above, determines actions in order of the suitability for the situation and can improve the capability of alerting the target while reducing the inconvenience caused to the neighbors.

Further, the image processing apparatus 10 according to the present embodiment changes the predetermined priorities in accordance with the surrounding environment. The capability of alerting the target and the degree of inconvenience caused to the neighbors can change depending on the space where the movable object 12 is located, a time period, and other parameters. Accordingly, the image processing apparatus 10, which is configured as described above, can further improve the capability of alerting the target while reducing the inconvenience caused to the neighbors.

The present invention has been described with reference to the drawings and based on the examples, and it should be noted that those skilled in the art can easily make various modifications and corrections based on the present disclosure. Thus, it should be noted that those modifications and corrections do not depart from the scope of the present invention.

For example, although the image processing apparatus 10 is mounted in or on the movable object 12 in the present embodiment, the image processing apparatus 10 need not be mounted in or on the movable object 12. For example, the image processing apparatus 10 may be an apparatus such as a server on a network. Then, by using communication with the server via the network, imagery of the surrounding region may be acquired from the movable object 12, and the information indicating the first action and the actions following the first action may be supplied to the movable object 12.

A number of aspects of content of this disclosure are presented as a series of operations performed by hardware such as a computer system that can execute program commands. Examples of the hardware such as a computer system include programmable data processing apparatuses such as a general-purpose computer, a personal computer (PC), a dedicated computer, a workstation, a personal communications system (PCS) or a personal mobile communications system, a mobile (cellular) telephone, a mobile telephone having a data processing function, a radio frequency identification (RFID) receiver, a game machine, an electronic notepad, a laptop computer, and a global positioning system (GPS) receiver. It is to be noted that various operations in each embodiment are performed either by a dedicated circuit (such as discrete logic gates interconnected with each other to perform a specific function) that implements program commands (software) or by components such as logic blocks and program modules that are executed by one or more processors. Examples of the one or more processors, which execute components such as logic blocks and program modules, include one or more microprocessors, a central processing unit (CPU), an application specific integrated circuit (ASIC), a digital signal processor (DSP), a programmable logic device (PLD), a field programmable gate array (FPGA), a processor, a controller, a microcontroller, a microprocessor, an electronic device, other devices designed to be able to perform the functions described herein, and/or a combination of the devices described herein. The embodiment described herein is implemented by using, for example, hardware, software, firmware, middleware, microcode, or a combination thereof. A command may be a program code or a code segment for executing a necessary task. A command can be stored in a non-transitory machine-readable storage medium or other media. A code segment may represent any combination of a procedure, a function, a subprogram, a program, a routine, a subroutine, a module, a software package, a class or a command, a data structure, and a program statement. A code segment transmits and/or receives information, data arguments, variables, or stored content to and/or from other code segments or hardware circuits, thereby connecting to the other code segments or the hardware circuits.

REFERENCE SIGNS LIST 10 image processing apparatus
11 imaging apparatus
12 movable object
13 imaging unit
14 output unit
15 storage unit
16 processor
17 flagman
18 pedestrian
19 crosswalk

The invention claimed is:

1. An image processing apparatus comprising:
an output unit that outputs to a movable object information indicating an action to be performed by the movable object; and
a processor that
determines a first action of the movable object based on a state of a human target, the state being sensed in captured imagery of a region around the movable object;
causes the output unit to output information indicating the first action, and by outputting the information, the output unit causes the movable object to perform the first action indicated by the information;
determines a second action of the movable object based on a second state of the human target, the second state being sensed in imagery of the region around the movable object that is captured after the first action of the movable object; and
causes the output unit to output information indicating the second action at a time depending on a speed of a human gesture that the human target makes before the first action is determined or after the first action of the movable object, and by outputting the information, the output unit causes the movable object to perform the second action indicated by the information.

2. The image processing apparatus according to claim 1, wherein the imagery of the region around the movable object used in determining the second action is captured during a time period that elapses after the first action of the movable object, the time period depending on the speed of the human gesture.

3. The image processing apparatus according to claim 1, wherein the time is advanced as the speed of the human gesture increases.

4. The image processing apparatus according to claim 1, wherein the processor changes the time in accordance with traffic around the movable object.

5. The image processing apparatus according to claim 4, wherein the time is advanced as the traffic around the movable object becomes congested.

6. The image processing apparatus according to claim 1, wherein the processor determines the second action when it is determined based on the second state of the human target that no meaningful response to the first action is obtained from the human target.

7. The image processing apparatus according to claim 1, wherein the processor determines as the first action and the second action at least one of moving forward, moving backward, stopping, slowing down, changing direction, switching on a light, flashing, causing a turn signal to blink, sounding a horn, presenting a display viewable from outside, maintaining a current state, outputting a voice message, and/or projecting a predetermined image.

8. The image processing apparatus according to claim 1, wherein the processor determines in accordance with predetermined priorities a plurality of actions to be performed after the first action, the plurality of actions being selected from moving forward, moving backward, stopping, slowing down, changing direction, switching on a light, flashing, causing a turn signal to blink, sounding a horn, presenting a display viewable from outside, maintaining a current state, outputting a voice message, and projecting a predetermined image.

9. The image processing apparatus according to claim 8, wherein the processor changes the predetermined priorities in accordance with a surrounding environment.

10. An imaging apparatus comprising:
the image processing apparatus according to claim 1; and
an imaging unit that generates the imagery of the region around the movable object.

11. The movable object comprising the imaging apparatus according to claim 10.

12. A method for image processing, comprising:
sensing a state of a human target in captured imagery of a region around a movable object;
determining a first action of the movable object based on the state of the human target;
outputting information indicating the first action to the movable object, and by outputting the information, causing the movable object to perform the first action indicated by the information;
sensing a second state of the human target in imagery of the region around the movable object, the imagery being captured after the first action of the movable object;
determining a second action of the movable object based on the second state of the human target; and
outputting information indicating the second action to the movable object at a time depending on a speed of a human gesture that the human target makes before the first action is determined or after the first action of the movable object, and by outputting the information, causing the movable object to perform the second action indicated by the information.

* * * * *